(12) United States Patent
Sawanishi et al.

(10) Patent No.: US 11,065,712 B2
(45) Date of Patent: Jul. 20, 2021

(54) RESISTANCE SPOT WELDING METHOD

(71) Applicant: JFE STEEL CORPORATION, Tokyo (JP)

(72) Inventors: Chikaumi Sawanishi, Tokyo (JP); Hiroshi Matsuda, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 304 days.

(21) Appl. No.: 16/305,152

(22) PCT Filed: May 23, 2017

(86) PCT No.: PCT/JP2017/019254
§ 371 (c)(1),
(2) Date: Nov. 28, 2018

(87) PCT Pub. No.: WO2017/212916
PCT Pub. Date: Dec. 14, 2017

(65) Prior Publication Data
US 2019/0344376 A1      Nov. 14, 2019

(30) Foreign Application Priority Data
Jun. 9, 2016 (JP) .............................. JP2016-115481

(51) Int. Cl.
*B23K 11/25*    (2006.01)
*B23K 11/24*    (2006.01)
(Continued)

(52) U.S. Cl.
CPC ............. *B23K 11/24* (2013.01); *B23K 11/115* (2013.01); *B23K 11/257* (2013.01); *B23K 2101/18* (2018.08); *B23K 2103/04* (2018.08)

(58) Field of Classification Search
CPC ....... B23K 11/24; B23K 11/115; B23K 11/25; B23K 11/257; B23K 11/258
See application file for complete search history.

(56) References Cited

U.S. PATENT DOCUMENTS 6,057,523 A    5/2000  Fujii et al.
6,130,396 A   10/2000  Hasegawa et al.
(Continued)

FOREIGN PATENT DOCUMENTS

CN    102430851 A    5/2012
CN    103889634 A    6/2014
(Continued)

OTHER PUBLICATIONS

Jul. 25, 2017, International Search Report issued in the International Patent Application No. PCT/JP2017/019254.
(Continued)

*Primary Examiner* — Robert J Utama
*Assistant Examiner* — Ayub A Maye
(74) *Attorney, Agent, or Firm* — Kenja IP Law PC (57) ABSTRACT

A resistance spot welding method of squeezing parts to be welded, which are a plurality of overlapping metal sheets, by a pair of electrodes and passing a current while applying an electrode force to join the parts to be welded comprises: a first step of passing a current by constant current control to form a fusion zone having a diameter of not less than $2\sqrt{t}$, expressed in mm, between the metal sheets, where t, expressed in mm, is a sheet thickness of a thinnest metal sheet of the metal sheets; a second step of cooling the fusion zone to have a diameter of not greater than 80% of D, where D, expressed in mm, is a diameter of the fusion zone formed in the first step; and a third step of performing adaptive control welding by controlling a current passage amount according to a target that is set.

4 Claims, 1 Drawing Sheet

(51) Int. Cl.
   *B23K 11/11*    (2006.01)
   *B23K 101/18*   (2006.01)
   *B23K 103/04*   (2006.01)

(56) References Cited

U.S. PATENT DOCUMENTS

| | | | |
|---|---|---|---|
| 8,779,320 B2* | 7/2014 | Watanabe | B23K 11/115 |
| | | | 219/55 |
| 2010/0065533 A1* | 3/2010 | Buda | B23K 11/115 |
| | | | 219/110 |
| 2011/0180518 A1* | 7/2011 | Hasegawa | B23K 11/115 |
| | | | 219/108 |
| 2012/0055910 A1 | 3/2012 | Sakai et al. | |
| 2013/0248505 A1* | 9/2013 | Anayama | B23K 31/125 |
| | | | 219/130.01 |
| 2014/0305912 A1 | 10/2014 | Taniguchi et al. | |
| 2014/0308070 A1 | 10/2014 | Taniguchi et al. | |
| 2015/0174690 A1* | 6/2015 | Furusako | B23K 11/115 |
| | | | 219/91.22 |
| 2016/0008913 A1 | 1/2016 | Okita et al. | |
| 2016/0008914 A1 | 1/2016 | Okita et al. | |
| 2016/0016252 A1 | 1/2016 | Edwards, II | |
| 2016/0076117 A1 | 3/2016 | Terajima et al. | |
| 2016/0082543 A1* | 3/2016 | Wakabayashi | B23K 11/115 |
| | | | 219/86.31 |
| 2016/0236294 A1 | 8/2016 | Sawanishi et al. | |

FOREIGN PATENT DOCUMENTS

| | | |
|---|---|---|
| CN | 103958110 A | 7/2014 |
| CN | 105073326 A | 11/2015 |
| CN | 105612020 A | 5/2016 |
| JP | H09216071 A | 8/1997 |
| JP | H1094883 A | 4/1998 |
| JP | H1133743 A | 2/1999 |
| JP | 2003236674 A | 8/2003 |
| JP | 2006043731 A | 2/2006 |
| JP | 2013188752 A | 9/2013 |
| JP | 2016055337 A | 4/2016 |
| JP | 2016068142 A | 5/2016 |
| WO | 2014136507 A1 | 9/2014 |
| WO | 2015049998 A1 | 4/2015 |

OTHER PUBLICATIONS

Jun. 21, 2019, the Extended European Search Report issued by the European Patent Office in the corresponding European Patent Application No. 17810097.0.

Jun. 1, 2020, Office Action issued by the China National Intellectual Property Administration in the corresponding Chinese Patent Application No. 201780032921.8 with English language search report.

May 29, 2020, Office Action issued by the Korean Intellectual Property Office in the corresponding Korean Patent Application No. 10-2019-7000118 with English language concise statement of relevance.

Nov. 29, 2019, Office Action issued by the Korean Intellectual Property Office in the corresponding Korean Patent Application No. 10-2019-7000118 with English language Concise Statement of Relevance.

* cited by examiner

RESISTANCE SPOT WELDING METHOD

TECHNICAL FIELD

The present disclosure relates to a resistance spot welding method. The present disclosure is particularly intended to ensure a stable nugget diameter without expulsion (splash) even in the case where the effects of disturbances such as current shunting or a sheet gap are significant.

BACKGROUND

Overlapping steel sheets are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. Heat generated from the resistance to the flow of the high welding current is used to obtain a spot weld. The spot weld is called a nugget, and results from the overlapping steel sheets melting and solidifying at their contact portion when the current flows through the steel sheets. The steel sheets are spot-joined by this nugget.

For good weld quality, it is important to form the nugget with a diameter in an appropriate range. The nugget diameter depends on the welding conditions such as welding current, welding time, electrode shape, and electrode force. To achieve an appropriate nugget diameter, the welding conditions need to be set appropriately according to the parts-to-be-welded conditions such as the material, sheet thickness, and number of overlapping sheets of the parts to be welded.

In vehicle manufacturing, for example, spot welding is performed at several thousand points per vehicle, and parts to be welded (workpieces) conveyed one after another need to be welded. If the state of the parts to be welded such as the material, sheet thickness, and number of overlapping sheets of the parts to be welded is the same at each welding location, the same welding conditions such as welding current, welding time, and electrode force can be used to obtain the same nugget diameter. In continuous welding, however, the contact surfaces of the electrodes with the parts to be welded wear gradually and the contact areas widen gradually as compared with the initial state. When the same welding current as in the initial state is passed in such a state where the contact areas have widened, the current density in the parts to be welded decreases and the temperature rise of the weld decreases, which leads to a smaller nugget diameter. Accordingly, the electrodes are dressed or replaced every several hundred to several thousand welding points, to prevent the electrode tip diameter from increasing excessively.

A resistance welding device having a function (stepper function) of increasing the welding current after a predetermined number of welding operations to compensate for a decrease in current density associated with electrode wear has been conventionally used, too. To use the stepper function, the above-mentioned welding current change pattern needs to be set appropriately beforehand. However, considerable time and cost are required to derive the welding current change patterns corresponding to numerous welding conditions and parts-to-be-welded conditions through tests and the like. Besides, since the state of progress of electrode wear varies in actual work, the welding current change pattern set beforehand may not always be appropriate.

In addition, in the case where disturbances are present during welding, such as when a point that has already been welded (existing weld) is present near the current welding point or when the parts to be welded have considerable surface roughness and a contact point of the parts to be welded is present near the welding point, part of the current is shunted into such an existing weld or contact point during welding. In this state, even when welding is performed under predetermined conditions, the current density at the position to be welded which is directly above and below the electrodes decreases, and so a nugget of a required diameter cannot be obtained. To compensate for such an insufficient amount of heat generated and obtain a nugget of a required diameter, a high welding current needs to be set beforehand.

Moreover, in the case where the surroundings of the welding point are strongly restrained due to surface roughness, member shape, etc. or in the case where foreign matter is present between the steel sheets around the welding point, a larger sheet gap between the steel sheets causes a smaller contact diameter of the steel sheets, which may facilitate expulsion.

The following techniques have been proposed to solve the problems stated above.

For example, JP 2003-236674 A (PTL 1) discloses a spot welding method for high tensile strength steel sheets whereby spot welding is performed through the following steps to suppress expulsion caused by poor fitness in an initial stage of current passage: a first step of gradually increasing the current to high tensile strength steel sheets to form a nugget; a second step of decreasing the current after the first step; and a third step of, after the second step, increasing the current to perform actual welding and gradually decreasing the current.

JP 2006-43731 A (PTL 2) discloses a current control method in spot welding whereby such a current that can suppress spattering is maintained for a predetermined time in an initial part of welding time to soften the surfaces of parts to be welded and then a high current is maintained for a predetermined time to grow a nugget while suppressing spattering.

JP H9-216071 A (PTL 3) discloses a control unit of a resistance welder that compares an estimated temperature distribution of a weld and a target nugget and controls the output of the welder to obtain the set nugget diameter.

JP H10-94883 A (PTL 4) discloses a welding condition control method for a resistance welder of detecting the welding current and the voltage between tips, simulating a weld through heat transfer calculation, and estimating the nugget formation state in the weld during welding to achieve good welding.

JP H11-33743 A (PTL 5) discloses a resistance welding system that calculates, from the sheet thickness of parts to be welded and the welding time, the cumulative amount of heat generated per unit volume with which good welding of the parts to be welded is possible, and adjusts the welding current or voltage to generate the calculated amount of heat per unit volume and per unit time, to achieve good welding regardless of the type of the parts to be welded or the wear state of the electrodes.

CITATION LIST

Patent Literatures

PTL 1: JP 2003-236674 A
PTL 2: JP 2006-43731 A
PTL 3: JP H9-216071 A

PTL 4: JP H10-94883 A
PTL 5: JP H11-33743 A
PTL 6: WO 2014/136507 A1

SUMMARY

Technical Problem

However, with the techniques described in PTL 1 and PTL 2, given that appropriate welding conditions are likely to vary depending on the presence or absence of disturbances and the magnitude of the disturbances, a desired nugget diameter cannot be ensured without expulsion when a larger sheet gap or current shunting than expected occurs.

The techniques described in PTL 3 and PTL 4 need complex calculation to estimate the nugget temperature based on a heat transfer model (heat transfer simulation) and the like. This requires a welding control unit that is not only complex in structure but also expensive.

The technique described in PTL 5 enables good welding even with certain electrode wear, by adjusting the cumulative amount of heat generated to the target. However, in the case where the set parts-to-be-welded conditions and the actual parts-to-be-welded conditions are significantly different, such as when disturbances such as the above-mentioned existing weld are present nearby, or in the case where the time variation pattern of the amount of heat generated changes greatly in a short period of time, such as when welding hot-dip galvanized steel sheets having a large coating amount, adaptive control cannot keep up. Even when the final cumulative amount of heat generated can be adjusted to the target, the heat generation pattern, namely, the time variation of the temperature distribution of the weld, deviates from the target heat pattern for obtaining a good weld. This hinders the obtainment of a required nugget diameter, or causes expulsion.

For example, an attempt to adjust the cumulative amount of heat generated to the target in the case where the effect of current shunting is significant causes marked heat generation not between the steel sheets but between the electrodes and the steel sheets, and facilitates expulsion from the steel sheet surfaces.

Further, while the techniques described in PTL 3 to PTL 5 are all effective to some extent for the change in the case where the electrode tips wear, these techniques do not take into consideration the situations where the effect of current shunting is significant because of, for example, the presence of an existing weld nearby. Hence, adaptive control does not actually function in some cases.

In view of this, we previously developed the following method and disclosed it in WO 2014/136507 A1 (PTL 6): "A method of resistance spot welding to join parts to be welded by squeezing the parts between a pair of electrodes and passing current while applying pressure, the parts being a plurality of overlapping metal sheets, the method comprising: dividing a current pattern into two or more steps for welding; before actual welding, performing test welding to store, for each step as a target, a time variation of an instantaneous amount of heat generated per unit volume and a cumulative amount of heat generated per unit volume that are calculated from an electrical property between electrodes when forming an appropriate nugget by passing current with constant current control; and subsequently, as actual welding, starting welding using, as a standard, a time variation curve of the instantaneous amount of heat generated per unit volume obtained by the test welding, and when a time variation amount of an instantaneous amount of heat generated deviates during any step from the time variation curve by a difference, performing adaptive control welding to control a current passage amount in order to compensate for the difference during a remaining welding time in the step so as to match a cumulative amount of heat generated in the actual welding to the cumulative amount of heat generated that is determined in advance in the test welding."

With the technique described in PTL 6, a nugget of a good diameter can be obtained even in the case where the electrode tips wear or disturbances are present.

However, in the case where the effects of disturbances are particularly significant, such as when a large nugget diameter needs to be ensured, when an existing weld is present immediately nearby or many existing welds are present around the welding point, or when the sheet gap between the steel sheets is large, excessive heat may be generated near the electrodes and cause expulsion. A satisfactory nugget diameter cannot be obtained in such a case.

It could be helpful to provide, as an improvement on the technique described in PTL 6, a resistance spot welding method that, even in the case where the effects of disturbances are particularly significant as mentioned above, can obtain a nugget of an appropriate diameter without expulsion or an increase in welding time.

Solution to Problem

We conducted intensive study to achieve the object stated above.

As mentioned earlier, in the case where the effects of disturbances are significant and further the electrode tips wear, even when adaptive control welding is performed with the cumulative amount of heat generated that is obtained by the test welding being set as the target according to the technique described in PTL 6, the heat generation pattern, namely, the time variation of the temperature distribution (hereafter also referred to as "heat pattern") of the weld may differ from the target conditions (i.e. the time variation of the temperature distribution of the weld when a good weld is obtained in the test welding). This hinders the obtainment of a required nugget diameter, or causes expulsion.

We examined this point more closely, and discovered the following: Before the start of resistance spot welding and in an initial stage of welding, the resistance between the steel sheets at the welding point is high, and the current passage diameter has not been secured yet. Accordingly, when adaptive control welding is performed with the cumulative amount of heat generated that is obtained by the test welding being set as the target in the case where disturbances are present, e.g. in the case where the effect of current shunting is significant, the welding current increases considerably in a state where the current passage diameter between the steel sheets has not been secured in the initial stage of welding. This causes marked heat generation not between the steel sheets but between the electrodes and the steel sheets, and results in a large difference in heat generation pattern from the test welding.

Besides, particularly in the case where the sheet gap between the steel sheets is large, the steel sheets warp greatly along the electrode shape. The contact area between the electrodes and the steel sheets thus increases, as compared with the case where there is no sheet gap. Hence, the current density near the electrodes decreases, and heat releasing to the electrodes is promoted. Consequently, nugget growth in the sheet thickness direction is hindered, and a thin nugget tends to form.

Further, a phenomenon that, with a decrease in the volume of a fusion zone, the specific resistance of the weld decreases and the interelectrode voltage decreases can occur. In the case of performing adaptive control welding using, as the target, the time variation of the instantaneous amount of heat generated per unit volume and the cumulative amount of heat generated per unit volume, the welding control unit recognizes such a decrease in interelectrode voltage as a decrease in the amount of heat generated, and rapidly increases the welding current even if actually an appropriate nugget diameter has been obtained. This causes expulsion.

In view of the above, we conducted further examination, and discovered the following: By forming a fusion zone of at least a predetermined size, then cooling (solidifying) the fusion zone, and then performing adaptive control welding to control the current passage amount according to the target calculated from the electrical property between the electrodes in the case of forming a preset appropriate nugget, the heat pattern of the weld in the adaptive control welding can follow the heat pattern in the test welding even in the case where the effects of disturbances are particularly significant. A nugget of an appropriate diameter can thus be obtained without expulsion or an increase in welding time.

The present disclosure is based on these discoveries and further studies.

We thus provide:

1. A resistance spot welding method of squeezing parts to be welded by a pair of electrodes, and passing a current while applying an electrode force to join the parts to be welded, the parts to be welded being a plurality of overlapping metal sheets, the resistance spot welding method comprising: a first step of passing a current by constant current control to form a fusion zone having a diameter of not less than $2\sqrt{t}$, expressed in mm, between the metal sheets, where t, expressed in mm, is a sheet thickness of a thinnest metal sheet of the metal sheets; a second step of cooling the fusion zone to have a diameter of not greater than 80% of D, where D, expressed in mm, is a diameter of the fusion zone formed in the first step; and a third step of performing adaptive control welding by controlling a current passage amount according to a target that is set.

2. The resistance spot welding method according to 1., wherein test welding for setting the target is performed beforehand, in the test welding, first to third test steps corresponding to the first to the third steps are performed by constant current control, to derive a time variation curve of an instantaneous amount of heat generated per unit volume and a cumulative amount of heat generated per unit volume at least in the third test step, and in the third step, the target is set to the time variation curve of the instantaneous amount of heat generated per unit volume and the cumulative amount of heat generated per unit volume that are derived in the third test step, welding is performed using the time variation curve as the target, and, in the case where an amount of time variation of an instantaneous amount of heat generated per unit volume in the third step differs from the time variation curve, adaptive control welding is performed to control the current passage amount in order to compensate for the difference within a remaining welding time in the third step so that a cumulative amount of heat generated in the third step matches the cumulative amount of heat generated that is derived beforehand in the third test step.

3. The resistance spot welding method according to 1. or 2., wherein in the first step, the current is passed to satisfy a relationship $tx/t0 \leq 0.95$, where tx, expressed in mm, is a total thickness of the fusion zone formed between the metal sheets in the first step, and t0, expressed in mm, is a total thickness of the parts to be welded.

Advantageous Effect

It is thus possible to obtain a good nugget without expulsion or an increase in welding time even in the case where the effects of disturbances are particularly significant, such as when a large nugget diameter is needed, when an existing weld is present immediately nearby or many existing welds are present around the welding point, or when the sheet gap between the steel sheets is large.

DETAILED DESCRIPTION

The present disclosure is described below, by way of embodiments.

One of the disclosed embodiments relates to a resistance spot welding method of squeezing, by a pair of electrodes, parts to be welded which are a plurality of overlapping metal sheets, and passing a current while applying an electrode force to join the parts to be welded. The resistance spot welding method comprises: a first step of passing a current by constant current control to form a fusion zone having a diameter of not less than $2\sqrt{t}$ (mm) between the metal sheets, where t (mm) is the sheet thickness of the thinnest metal sheet of the metal sheets; a second step of cooling the fusion zone to have a diameter of not greater than 80% of D, where D (mm) is the diameter of the fusion zone formed in the first step; and a third step of performing adaptive control welding by controlling a current passage amount according to a set target.

Any welding device that includes a pair of upper and lower electrodes and is capable of freely controlling each of the electrode force and the welding current during welding may be used in the resistance spot welding method according to one of the disclosed embodiments. The force mechanism (air cylinder, servomotor, etc.), the type (stationary, robot gun, etc.), the electrode shape, and the like are not limited.

The basic structure of the resistance spot welding method according to one of the disclosed embodiments is described below, for each step.

First Step

In the first step, a current is passed by constant current control to form a fusion zone having a diameter of not less than $2\sqrt{t}$ (mm) between the metal sheets, where t (mm) is the sheet thickness of the thinnest metal sheet of the parts to be welded.

By forming a fusion zone having a diameter of not less than $2\sqrt{t}$ (mm) between the metal sheets in the first step, the steel sheets expand by melting, and also soften as a result of heating around the electrodes. The contact area between the electrodes and the steel sheets thus increases. Consequently, the difference in contact area from the test welding pattern due to the presence or absence of a sheet gap and the magnitude of the sheet gap at the start of the below-mentioned third step, i.e. adaptive control welding, decreases. This enables the heat pattern of the weld in the adaptive control welding to follow the heat pattern in the test welding, even in the case where the effects of disturbances are particularly significant. A desired nugget diameter can thus be obtained while effectively preventing expulsion.

For example, the current passage conditions for forming a fusion zone having a diameter of not less than $2\sqrt{t}$ (mm) between the metal sheets of the parts to be welded in the first step can be determined as follows.

In a state without disturbances such as a sheet gap or current shunting to an existing weld or in a state simulating expected disturbances, a preliminary welding test is performed by constant current control under various conditions using metal sheets of the same steel type and thickness as the parts to be welded used in the actual welding.

The conditions (welding current, welding time, electrode force) for forming a fusion zone having the target fusion zone diameter (not less than $2\sqrt{t}$ (mm)) between the metal sheets of the parts to be welded in both of the state without disturbances and the state with disturbances are then determined, and a current is passed by constant current control under the determined conditions. The formation state of the fusion zone can be checked, after solidification, by a peel test or by cross-sectional observation at the nugget center (by etching with a saturated picric acid solution). The diameter of the fusion zone mentioned here is the length, on an overlapping line of the metal sheets, of the fusion zone formed between the metal sheets in a cross section of the weld taken at the center in the sheet transverse direction.

The current is preferably passed under the conditions for forming a fusion zone having a diameter of not less than $2.5\sqrt{t}$ (mm) between the metal sheets of the parts to be welded, in the case where the effects of disturbances are particularly significant, such as:

(1) when a large nugget diameter needs to be ensured (e.g. the target nugget diameter is $4.5\sqrt{t}$ or more);

(2) an existing weld is present immediately nearby (e.g. the distance between the welding point and the existing weld is 7 mm or less) or many existing welds are present around the welding point (e.g. three or more existing welds are present around the welding point); or (3) the effect of a sheet gap is considerable (e.g. there is a sheet gap of 2.5 mm or more in at least one location between the metal sheets, or the sheet gap distance is less than 40 mm).

In terms of preventing expulsion in the first step, the diameter of the fusion zone formed in the first step is preferably not greater than 80% of the final target nugget diameter. The diameter of the fusion zone formed in the first step is more preferably not greater than 70% of the final target nugget diameter.

Moreover, in the first step, the current is preferably passed to satisfy the relationship $tx/t0 \leq 0.95$, where $tx$ (mm) is the total thickness of the fusion zone formed between the metal sheets in the first step, and $t0$ (mm) is the total thickness of the parts to be welded (before welding start).

This is because, since the thickness of the fusion zone decreases as a result of cooling in the below-mentioned second step, the difference in the thickness of the fusion zone from the test welding pattern due to the presence or absence of a sheet gap and the magnitude of the sheet gap at the start of the adaptive control welding can be reduced more, and consequently expulsion in the adaptive control welding can be prevented more advantageously to obtain a nugget of an appropriate diameter. In the case where the effects of disturbances are particularly significant, it is more preferable to satisfy the relationship $tx/t0 \leq 0.90$. In terms of further reducing the difference in the thickness of the fusion zone from the test welding pattern due to the presence or absence of a sheet gap and the magnitude of the sheet gap at the start of the adaptive control welding, $tx/t0$ is preferably 0.10 or more. $tx/t0$ is more preferably 0.30 or more.

To form a fusion zone so as to satisfy the relationship $tx/t0 \leq 0.95$, for example, the same preliminary welding test as described above may be performed to determine such conditions that form a fusion zone satisfying the relationship $tx/t0 \leq 0.95$.

The total thickness of the fusion zone mentioned here is the maximum total thickness of the fusion zone formed between the metal sheets in a cross section of the weld taken at the center in the sheet transverse direction. This can be checked, for example, by cross-sectional observation at the nugget center (by etching with a saturated picric acid solution).

Second Step

Next, the fusion zone is cooled to have a diameter of not greater than 80% of D, where D (mm) is the diameter of the fusion zone formed in the first step. Herein, the fusion zone denotes a portion in a molten state, and the diameter of the fusion zone changes as appropriate depending on the molten state.

No lower limit is placed on the diameter of the fusion zone in the cooling in the second step, and the diameter of the fusion zone in the cooling in the second step may be 0% (completely solidified state).

The fusion zone cooling method is, for example, a method of providing a cooling time C2 (ms) during which current passage is stopped. The cooling time C2 varies depending on the sheet combination and the nugget diameter. For example, the same preliminary welding test as described above may be performed to determine such a cooling time that allows the fusion zone to have a diameter of not greater than 80% of D.

Especially, it is preferable to satisfy the relationship $C2 \geq 20 \cdot t0/R$, where t0 is the total thickness (mm) of the parts to be welded, and R is the electrode tip diameter (mm). In the case where the effects of disturbances are particularly significant, it is more preferable to satisfy the relationship $C2 \geq 30 \cdot t0/R$.

No upper limit is placed on the cooling time C2, yet the cooling time C2 is preferably 1000 ms or less in terms of productivity.

Third Step

In the third step, adaptive control welding is performed by controlling the current passage amount according to the set target.

For example, test welding for setting the target is performed beforehand, and the target is set to the time variation curve of the instantaneous amount of heat generated per unit volume and the cumulative amount of heat generated per unit volume that are derived in a third test step in the test welding corresponding to the third step. Welding is performed using the time variation curve as the target, and, in the case where the amount of time variation of the instantaneous amount of heat generated in the third step differs from the time variation curve, adaptive control welding is performed to control the current passage amount in order to compensate for the difference within the remaining welding time in the third step so that the cumulative amount of heat generated in the third step matches the cumulative amount of heat generated that is derived beforehand in the third test step.

If the amount of time variation of the instantaneous amount of heat generated follows the time variation curve, the welding is continued without change and completed.

By performing welding in the first to third steps under the conditions described above, even in the case where the effects of disturbances are particularly significant and further the electrode tips wear, it is possible to reduce the difference in the contact area between the electrodes and the steel sheets and further the difference in the thickness of the fusion zone from the test welding pattern due to the presence or absence of a sheet gap and the magnitude of the sheet gap at the start of current passage in the third step, i.e. the adaptive control welding.

This enables the heat pattern of the weld in the adaptive control welding to follow the heat pattern in the test welding, and avoids false recognition that the amount of heat generated has increased locally or the amount of heat generated is insufficient. A desired nugget diameter can thus be obtained while effectively preventing expulsion.

The test welding is described below.

(Test Welding)

It is preferable that, in the test welding, welding is performed in first to third test steps corresponding to the first to third steps by constant current control, to derive the time variation of the instantaneous amount of heat generated per unit volume and the cumulative amount of heat generated per unit volume at least in the third test step.

For example, a welding test with the same steel type and thickness as the parts to be welded is performed with various conditions by constant current control under conditions corresponding to the conditions set in the first and second steps in a state without a sheet gap or current shunting to an existing weld, i.e. in a state without disturbances, to find optimal conditions in the test welding (optimal conditions in the test step corresponding to the third step).

Welding is then performed in the first to third test steps by constant current control, under the above-mentioned optimal conditions. In this way, the electrical property between the electrodes in the case where an appropriate nugget is formed in a state without disturbances is determined. From this electrical property between the electrodes, the time variation curve of the instantaneous amount of heat generated per unit volume and the cumulative amount of heat generated per unit volume at least in the third test step are derived, and set as the target in the third step. The test welding may be performed in a state with disturbances such as a sheet gap or current shunting, within the range in which the nugget diameter is substantially unchanged.

Herein, the electrical property between the electrodes means the interelectrode resistance or the interelectrode voltage.

The method of calculating the amount of heat generated is not limited. PTL 5 describes an example of the method, which may be used herein. The following is the procedure of calculating the amount q of heat generated per unit volume and per unit time and the cumulative amount Q of heat generated per unit volume according to this method.

Let t be the total thickness of the parts to be welded, r be the electrical resistivity of the parts to be welded, V be the interelectrode voltage, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q=(V \cdot I)/(S \cdot t) \quad (1).$$

The electrical resistance R of the columnar portion is given by the following Equation (2):

$$R=(r \cdot t)/S \quad (2).$$

Solving Equation (2) for S and substituting the solution into Equation (1) yields the amount q of heat generated as indicated by the following Equation (3):

$$q=(V \cdot I \cdot R)/(r \cdot t^2)=(V^2)/(r \cdot t^2) \quad (3).$$

As is clear from Equation (3), the amount q of heat generated per unit volume and per unit time can be calculated from the interelectrode voltage V, the total thickness t of the parts to be welded, and the electrical resistivity r of the parts to be welded, and is not affected by the contact area S of the electrodes and the parts to be welded. Although the amount of heat generated is calculated from the interelectrode voltage V in Equation (3), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 5, the cumulative amount Q may be calculated by any other method.

The parts to be welded used in the resistance spot welding method according to one of the disclosed embodiments are not limited. The resistance spot welding method may be used for welding of steel sheets and coated steel sheets having various strengths from mild steel to ultra high tensile strength steel and light metal sheets of aluminum alloys and the like. The resistance spot welding method may also be used for a sheet combination of three or more overlapping steel sheets.

The first step and the third step may further be divided into a plurality of current passage steps, or an upslope or a downslope may be added. Moreover, a subsequent current may be applied to heat-treat the weld after the current for nugget formation. The current passage conditions in this case are not limited, and also the magnitude relationships with the welding currents in the preceding steps are not limited.

The electrode force need not be constant, and may be divided into multiple levels as with the welding current.

Examples

Figure 1:
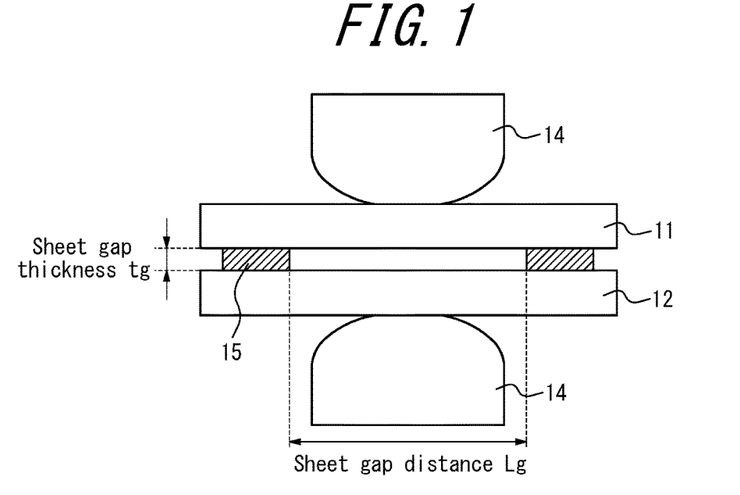
FIG. 1 is a diagram schematically illustrating an example of the case of welding a sheet combination having a sheet gap according to one of the disclosed embodiments.
Figure 2:
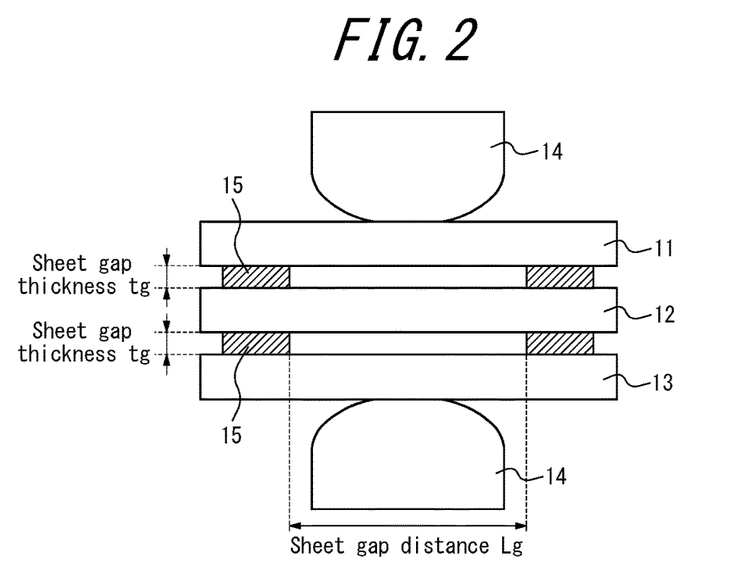
FIG. 2 is a diagram schematically illustrating another example of the case of welding a sheet combination having a sheet gap according to one of the disclosed embodiments.

For each sheet combination of two or three overlapping metal sheets listed in Table 1 and illustrated in FIGS. 1 and 2, resistance spot welding was performed under the conditions listed in Table 2 to produce a weld joint. As illustrated in FIGS. 1 and 2, spacers 15 were inserted between the metal sheets 11 to 13, and the sheet combination was clamped from above and below (not illustrated), to create a sheet gap of any of various sheet gap thicknesses tg and sheet gap distances Lg (for a sheet combination of three overlapping metal sheets, the sheet gap thickness tg and the sheet gap distance Lg between the metal sheets 11 and 12 and the sheet gap thickness tg and the sheet gap distance Lg between the metal sheets 12 and 13 are the same). In the drawings, reference sign 14 is an electrode.

The result in the case where the control mode is "constant current" in Table 2 indicates the result of performing welding by constant current control under the welding conditions listed in Table 2. The result in the case where the control mode is "adaptive control" in Table 2 indicates the result of, after performing test welding by constant current control in the absence of disturbances such as a sheet gap under the welding conditions listed in Table 2 to derive the time variation curve of the instantaneous amount of heat generated per unit volume and the cumulative amount of heat generated per unit volume, performing adaptive control welding of adjusting the current using the derived values as the target (the current in Table 2 in the case of "adaptive control" is the current in the test welding). The conditions such as welding time, electrode force, and cooling time were the same in the test welding and the actual welding.

An inverter DC resistance spot welder was used as the welder, and chromium copper electrodes with 6 mm face diameter DR-shaped tips were used as the electrodes.

For each obtained joint, the weld was cut and etched in section, and then observed with an optical microscope. Each sample in which each nugget diameter between the metal sheets was not less than $4.5\sqrt{t'}$ as a target diameter (t': the sheet thickness (mm) of the thinner metal sheet of adjacent two metal sheets) and no expulsion occurred was evaluated as good. Each sample in which any nugget diameter was less than $4.5\sqrt{t'}$ or expulsion occurred was evaluated as poor.

TABLE 1

| Sheet combination No. | Steel sheet of reference sign 11 in the drawings | Steel sheet of reference sign 12 in the drawings | Steel sheet of reference sign 13 in the drawings | t (mm) | $2\sqrt{t}$ (mm) |
|---|---|---|---|---|---|
| A | 980 MPa-grade cold rolled steel sheet (sheet thickness: 1.0 mm) | 980 MPa-grade cold rolled steel sheet (sheet thickness: 1.0 mm) | | 1.0 | 2.00 |
| B | 980 MPa-grade cold rolled steel sheet (sheet thickness: 1.6 mm) | 980 MPa-grade cold rolled steel sheet (sheet thickness: 1.6 mm) | | 1.6 | 2.53 |
| C | 980 MPa-grade cold rolled steel sheet (sheet thickness: 2.0 mm) | 980 MPa-grade cold rolled steel sheet (sheet thickness: 2.0 mm) | | 2.0 | 2.83 |
| D | 1180 MPa-grade cold rolled steel sheet (sheet thickness: 1.6 mm) | 1180 MPa-grade cold rolled steel sheet (sheet thickness: 1.6 mm) | | 1.6 | 2.53 |
| E | 270 MPa-grade cold rolled steel sheet (sheet thickness: 0.7 mm) | 980 MPa-grade cold rolled steel sheet (sheet thickness: 1.6 mm) | | 0.7 | 1.67 |
| F | 1470 MPa-grade cold rolled steel sheet (sheet thickness: 1.4 mm) | 1470 MPa-grade cold rolled steel sheet (sheet thickness: 1.4 mm) | | 1.4 | 2.37 |
| G | 590 MPa-grade cold rolled steel sheet (sheet thickness: 1.4 mm) | 1180 MPa-grade cold rolled steel sheet (sheet thickness: 1.6 mm) | | 1.4 | 2.37 |
| H | 270 MPa-grade GA steel sheet (sheet thickness: 1.0 mm) | 980 MPa-grade cold rolled steel sheet (sheet thickness: 1.6 mm) | | 1.0 | 2.00 |
| I | 980 MPa-grade GA steel sheet (sheet thickness: 1.6 mm) | 980 MPa-grade GA steel sheet (sheet thickness: 1.6 mm) | | 1.6 | 2.53 |
| J | 270 MPa-grade GI steel sheet (sheet thickness: 1.0 mm) | 980 MPa-grade cold rolled steel sheet (sheet thickness: 1.6 mm) | | 1.0 | 2.00 |
| K | 980 MPa-grade cold rolled steel sheet (sheet thickness: 1.0 mm) | 980 MPa-grade cold rolled steel sheet (sheet thickness: 1.0 mm) | 980 MPa-grade cold rolled steel sheet (sheet thickness: 1.0 mm) | 1.0 | 2.00 |
| L | 270 MPa-grade cold rolled steel sheet (sheet thickness: 0.7 mm) | 1180 MPa-grade cold rolled steel sheet (sheet thickness: 1.4 mm) | 980 MPa-grade cold rolled steel sheet (sheet thickness: 1.0 mm) | 0.7 | 1.67 |
| M | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.0 mm) | 0.7 | 1.67 |
| N | 440 MPa-grade cold rolled steel sheet (sheet thickness: 1.0 mm) | 980 MPa-grade cold rolled steel sheet (sheet thickness: 1.8 mm) | 980 MPa-grade cold rolled steel sheet (sheet thickness: 1.6 mm) | 1.0 | 2.00 |

TABLE 2

| Joint No. | Sheet combination No. | Electrode force F (kN) | First step Welding current I1 (kA) | First step Welding time T1 (ms) | First step Control mode | Second step Cooling time C2 (ms) | Third step Welding current I3 (kA) | Third step Welding time T3 (ms) | Third step Control mode |
|---|---|---|---|---|---|---|---|---|---|
| 1 | A | 3.5 | 4.5 | 200 | Constant current | 100 | 5.5 | 260 | Adaptive control |
| 2 | B | 5 | 6.5 | 320 | Constant current | 200 | 7.5 | 320 | Adaptive control |
| 3 | C | 5.5 | 7.5 | 100 | Constant current | 300 | 7.5 | 320 | Adaptive control |
| 4 | D | 4.5 | 7 | 140 | Constant current | 60 | 6 | 300 | Adaptive control |
| 5 | E | 4 | 7 | 120 | Constant current | 160 | 7.5 | 280 | Adaptive control |
| 6 | F | 5 | 5 | 200 | Constant current | 100 | 6 | 300 | Adaptive control |
| 7 | G | 5 | 5 | 240 | Constant current | 100 | 6 | 300 | Adaptive control |
| 8 | H | 3.5 | 6.5 | 120 | Constant current | 140 | 7.5 | 360 | Adaptive control |
| 9 | I | 4.5 | 6 | 260 | Constant current | 200 | 7 | 320 | Adaptive control |
| 10 | J | 4 | 6 | 300 | Constant current | 100 | 7 | 300 | Adaptive control |
| 11 | K | 5 | 5.5 | 200 | Constant current | 200 | 6 | 300 | Adaptive control |
| 12 | L | 4.5 | 6 | 240 | Constant current | 100 | 7 | 400 | Adaptive control |
| 13 | M | 5 | 7 | 260 | Constant current | 120 | 7.5 | 320 | Adaptive control |
| 14 | N | 5 | 6.5 | 300 | Constant current | 200 | 7 | 360 | Adaptive control |
| 15 | B | 5 | 7.5 | 320 | Adaptive control | — | — | — | — |
| 16 | D | 4 | 7 | 340 | Adaptive control | — | — | — | — |
| 17 | F | 5 | 3.5 | 100 | Constant current | 20 | 7.5 | 280 | Adaptive control |
| 18 | K | 4 | 6.5 | 300 | Adaptive control | — | — | — | — |
| 19 | M | 5 | 7.5 | 400 | Adaptive control | — | — | — | — |
| 20 | N | 5 | 7.5 | 400 | Adaptive control | — | — | — | — |
| 21 | B | 5 | 6.5 | 320 | Constant current | 10 | 8 | 320 | Adaptive control |

| Joint No. | Sheet gap thickness tg (mm) | Sheet gap distance Lg (mm) | 2√t (mm) | Diameter of fusion zone formed in first step D (mm) | tx/t0 | Ratio of diameter of fusion zone in second step to D* (%) | Evaluation | Remarks |
|---|---|---|---|---|---|---|---|---|
| 1 | 1.0 | 80 | 2.00 | 2.7 | 0.60 | 0 | Good | Example |
| 2 | 2.0 | 40 | 2.53 | 4.5 | 0.65 | 0 | Good | Example |
| 3 | 1.0 | 60 | 2.83 | 3.8 | 0.50 | 0 | Good | Example |
| 4 | 0.5 | 80 | 2.53 | 3.0 | 0.70 | 40.0 | Good | Example |
| 5 | 1.0 | 60 | 1.67 | 2.3 | 0.50 | 0 | Good | Example |
| 6 | 0.5 | 60 | 2.37 | 3.0 | 0.75 | 0 | Good | Example |
| 7 | 0.5 | 60 | 2.37 | 3.0 | 0.70 | 0 | Good | Example |
| 8 | 1.6 | 60 | 2.00 | 2.6 | 0.60 | 15.0 | Good | Example |
| 9 | 1.0 | 40 | 2.53 | 3.5 | 0.45 | 0 | Good | Example |
| 10 | 1.0 | 80 | 2.00 | 2.6 | 0.55 | 20.0 | Good | Example |
| 11 | 1.0 | 80 | 2.00 | Between steel sheets 11 and 12: 3.0 Between steel sheets 12 and 13: 3.0 | 0.60 | 0 | Good | Example |
| 12 | 0.5 | 60 | 1.67 | Between steel sheets 11 and 12: 2.0 Between steel sheets 12 and 13: 2.4 | 0.74 | 0 | Good | Example |
| 13 | 0.5 | 60 | 1.67 | Between steel sheets 11 and 12: 2.2 Between steel sheets 12 and 13: 2.6 | 0.80 | 0 | Good | Example |
| 14 | 1.0 | 80 | 2.00 | Between steel sheets 11 and 12: 2.5 Between steel sheets 12 and 13: 3.0 | 0.83 | 0 | Good | Example |
| 15 | 2.0 | 40 | 2.53 | — | — | — | Poor | Comparative Example |
| 16 | 2.0 | 40 | 2.53 | — | — | — | Poor | Comparative Example |
| 17 | 1.6 | 40 | 2.37 | 0 | — | — | Poor | Comparative Example |
| 18 | 1.6 | 40 | 2.00 | — | — | — | Poor | Comparative Example |
| 19 | 1.0 | 40 | 1.67 | — | — | — | Poor | Comparative Example |
| 20 | 1.6 | 40 | 2.00 | — | — | — | Poor | Comparative Example |
| 21 | 2.0 | 40 | 2.53 | 4.5 | 0.65 | 82.0 | Poor | Comparative Example |

*"0%" denotes a state in which each fusion zone was completely solidified in second step.

In all Examples, no expulsion occurred, and a nugget with a diameter of $4.5\sqrt{t}$ or more was obtained, regardless of the sheet gap thickness tg and the sheet gap distance Lg.

In all Comparative Examples, on the other hand, expulsion occurred or a nugget with a sufficient diameter was not formed.

REFERENCE SIGNS LIST

11, 12, 13 metal sheet
14 electrode
15 spacer

The invention claimed is:

1. A resistance spot welding method of squeezing parts to be welded by a pair of electrodes, and passing a current while applying an electrode force to join the parts to be welded, the parts to be welded being a plurality of overlapping metal sheets, the resistance spot welding method comprising:
   a first step is passing a constant current by constant current control between the metal sheets to form a fusion zone having a diameter of not less than $2\sqrt{t}$, expressed in mm, between the metal sheets, where t, expressed in mm, is a sheet thickness of a thinnest metal sheet of the metal sheets;
   a second step of cooling the fusion zone to have a diameter of not greater than 80% of D, where D, expressed in mm, is a diameter of the fusion zone formed in the first step; and
   a third step of performing adaptive control welding by controlling a current passage amount according to a target heat pattern that is set, wherein in the third step of performing adaptive control welding, controlling the current passage amount in order to compensate for a difference within a remaining welding time in the third step so that a cumulative amount of heat generated in the third step matches a cumulative amount of heat generated that is derived beforehand in a third test step.

2. The resistance spot welding method according to claim 1,
   wherein test welding for setting the target heat pattern is performed beforehand,
   in the test welding, first to third test steps corresponding to the first to the third steps are performed by constant current control, to derive a time variation curve of an instantaneous amount of heat generated per unit volume and a cumulative amount of heat generated per unit volume at least in the third test step, and
   in the third step, the target heat pattern is set to the time variation curve of the instantaneous amount of heat generated per unit volume and the cumulative amount of heat generated per unit volume that are derived in the third test step, welding is performed using the time variation curve as the target heat pattern, and, in the case where an amount of time variation of an instantaneous amount of heat generated per unit volume in the third step differs from the time variation curve, adaptive control welding is performed to control the current passage amount in order to compensate for the difference within a remaining welding time in the third step so that a cumulative amount of heat generated in the third step matches the cumulative amount of heat generated that is derived beforehand in the third test step.

3. The resistance spot welding method according to claim 1,
   wherein in the first step, the current is passed to satisfy a relationship $tx/t0 \leq 0.95$, where tx, expressed in mm, is a total thickness of the fusion zone formed between the metal sheets in the first step, and t0, expressed in mm, is a total thickness of the parts to be welded.

4. The resistance spot welding method according to claim 2,
   wherein in the first step, the current is passed to satisfy a relationship $tx/t0 \leq 0.95$, where tx, expressed in mm, is a total thickness of the fusion zone formed between the metal sheets in the first step, and t0, expressed in mm, is a total thickness of the parts to be welded.

\* \* \* \* \*